United States Patent [19]

Dahlin et al.

[11] Patent Number: 5,420,911
[45] Date of Patent: May 30, 1995

[54] CELLULAR TELEPHONE FOR MONITORING ANALOG AND DIGITAL CONTROL CHANNELS

[75] Inventors: Jan E. A. S. Dahlin, Jarfalla; Walter G. A. Mueller, Kista; Walter Ghisler, Upplands Vasby, all of Sweden

[73] Assignee: Telefonaktiebolaget L M Ericsson, Stockholm, Sweden

[21] Appl. No.: 132,163

[22] Filed: Oct. 4, 1993

Related U.S. Application Data

[63] Continuation of Ser. No. 751,763, Aug. 29, 1991, abandoned.

[51] Int. Cl.$^6$ ............................................. H04Q 7/32
[52] U.S. Cl. ...................................... 379/59; 379/58; 455/33.1
[58] Field of Search ................................. 379/58–61, 379/63; 455/33.1, 34.1, 34.2, 38.3, 88, 89, 90, 127, 343; 370/94.1, 95.1

[56] References Cited

U.S. PATENT DOCUMENTS

| | | | |
|---|---|---|---|
| 3,906,166 | 9/1975 | Cooper et al. | |
| 4,400,585 | 8/1983 | Kaman et al. | |
| 4,713,808 | 12/1987 | Gaskill et al. | 370/94.1 |
| 4,750,198 | 6/1988 | Harper | |
| 4,850,033 | 7/1989 | Eizenhöfer et al. | |
| 4,857,915 | 8/1989 | Andros et al. | |
| 4,903,319 | 2/1990 | Kasai et al. | |
| 4,903,320 | 2/1990 | Hanawa | |
| 4,989,230 | 1/1991 | Gillig et al. | 379/61 |
| 5,119,397 | 6/1992 | Dahlin et al. | 379/59 |
| 5,150,362 | 9/1992 | Akerberg | 379/60 |
| 5,228,074 | 7/1993 | Mizikovsky | 455/88 |

OTHER PUBLICATIONS

Motorola brochure: DYNA T.A.C 6000X Universal Mobile Telephone, 1984, 6 pages.
Article: IEEE Communications Magazine, "Trends in Cellular and Cordless Communications", Jun. 1991, Goodman, pp. 31–40.
Article: Ericsson Review, "Introduction of Digital Cellular Systems in North America", Lindell et al., No. 2, vol. 67, 1990.
Article: Telecommunications, "Hughes Network Systems Jump into the Cellular Arena with GM Backing", Global News Section, pp. 15–16, Feb. 1991.

*Primary Examiner*—Curtis Kuntz
*Assistant Examiner*—Dwayne D. Bost
*Attorney, Agent, or Firm*—Burns, Doane, Swecker & Mathis

[57] ABSTRACT

The present invention is directed to a cellular mobile radio telephone system in which mobile stations may select either analog or digital control channels. Analog and dual-mode mobile stations are equipped to become multi-mode mobile stations which monitor both analog and digital control channels depending on the selected mode. Downlink multi-mode mobile stations, while required to use analog control channels for call access, may nonetheless scan digital control and paging channels to receive downlink control and paging communications from the land-based system. Bi-directional multi-mode mobile stations have the same capabilities as downlink mobiles but also are equipped to transmit control information to the land station over the uplink digital control channel. If no digital control channel is available, the multi-mode mobile stations scan primary and secondary sets of analog control channels. In this way, analog and dual-mode mobile stations may benefit from the advantages of monitoring digital control channels and digital paging channels including multiple pages per channel and battery-saving capabilities.

26 Claims, 7 Drawing Sheets

| WORD 1 | $T_1T_2$ = 11 | DCC | SID1 | RSVD = 0 | A U T H | P C I | NAWC | OHD = 110 | P |
|---|---|---|---|---|---|---|---|---|---|
| | 2 | 2 | 14 | 1 | 1 | 1 | 4 | 3 | 12 |

| WORD 2 | $T_1T_2$ = 11 | DCC | S | E | REGH | REGR | DTX | N-1 | RCF | CPA | CMAX-1 | END | OHD = 111 | P |
|---|---|---|---|---|---|---|---|---|---|---|---|---|---|---|
| | 2 | 2 | 1 | 1 | 1 | 1 | 2 | 5 | 1 | 1 | 7 | 1 | 3 | 12 |

Fig. 2

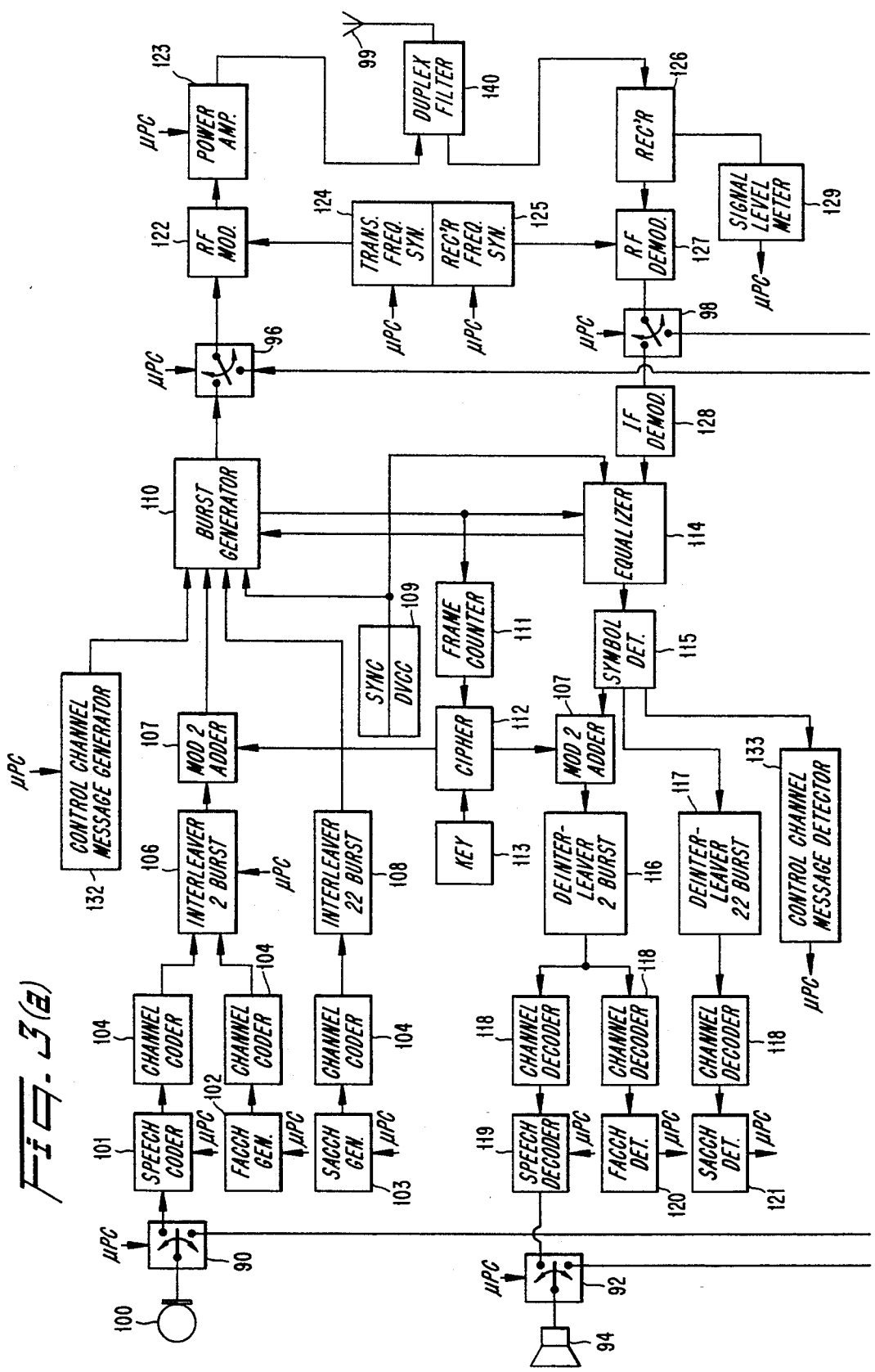

Fig. 6

| TYPES OF MOBILE STATIONS | | TRAFFIC CHANNELS | | CONTROL CHANNELS (CC) | | | COMMENT |
|---|---|---|---|---|---|---|---|
| | | ANALOG | DIGITAL | ANALOG | DIGITAL ↓ | DIGITAL ↕ | |
| I IS-54 | ANALOG | X | | X | | | ANALOG OR DIGITAL CONTROL CHANNELS |
| | DIGITAL | | X | X | | | |
| | DUAL-MODE | X | X | X | | | |
| II IS-7X | PURELY DIGITAL | | X | | | X | |
| III IS-54 & IS-7X MULTI-MODE | ANALOG | X | | X | X | | ANALOG AND DIGITAL CONTROL CHANNELS |
| | DIGITAL | | X | X | | X | |
| | DUAL-MODE | X | X | X | X | X | |

IS-54 = EXISTING US STANDARD
IS-7X = US STANDARD BEING WORKED ON

DIGITAL ↓ = DOWN LINK ONLY
DIGITAL ↕ = UP & DOWN LINK

CELLULAR TELEPHONE FOR MONITORING ANALOG AND DIGITAL CONTROL CHANNELS

This application is a continuation of application Ser. No. 07/751,763, filed Aug. 29, 1991, now abandoned.

FIELD OF THE INVENTION

The present invention is directed to cellular mobile radio telephone systems utilizing both analog and digital control channels for transmitting analog or digital control information between land or base stations and mobile stations which have analog only, digital only, or dual-mode traffic channel capabilities. In addition, the present invention is directed to a cellular telephone system where modified analog and dual-mode mobile radio telephones may select and communicate over either analog or digital control channels.

BACKGROUND OF THE INVENTION

Many of the existing cellular systems in the United States are analog-based systems. Because of significant increases in traffic capacity over the same frequency spectrum currently used in analog systems, lower cost operation, and additional mobile telephone features, such as battery-saving capabilities, a transition is being made from analog to digital communication in cellular telephone systems. That transition from analog to digital communication within the same frequency band is often achieved in a first step by replacing each of the fixed analog traffic channels with three digital traffic channels and in a second step by introducing a digital control channel, while maintaining as much as possible the same base station sites, cell sizes, and frequency plans designed for analog systems.

Despite the advantages purely digital or digital only mobile telephones have over their counterparts using analog control channels, many subscribers may be unwilling to discard their mobile telephones using analog control channels in order to purchase a purely digital mobile telephone. In addition, in many rural areas of the country, mobile telephones having only digital capabilities will not be practical because only analog control and traffic channels may be installed. On the other hand, while mobile telephones having analog control channels may be used anywhere in the country, they do not benefit from the new features intended for the digital only mobile telephones. It is therefore desirable to have a method of introducing the advantages attendant to purely digital cellular mobile telephones also to the mobile telephones using analog control channels.

In cellular systems using analog control channels, generally only one set of analog control channels is used. However, a second set of analog control channels, including dedicated control channels (DCC), paging channels (PC) and access channels (AC), may be used for setting up calls, informing the land system about the location of mobile stations, and for informing the mobile stations about the parameters of the land system. All mobile stations scan and read one of the dedicated control channels under certain specified conditions, for example, when the mobile stations become active, after a certain time period has elapsed, when ordered, or when the mobile station enters a new geographical part of the cellular system. A description of a cellular telephone system that incorporates a second set of analog control channels is set forth in U.S. patent application Ser. No. 514,540, filed Apr. 26, 1990, now U.S. Pat. No. 5,119,397 and assigned to the same assignee. The text of this patent is incorporated herein by reference.

While there has been little progress with respect to a completely integrated cellular telephone system with both analog and digital traffic and control channels, some paging systems have attempted to combine analog and digital capabilities. For example, U.S. Pat. No. 4,857,915 to Andros et al discloses a paging system which is compatible with transmissions from analog or digital paging transmitters, i.e. short, digital or analog voice messages may be transmitted. A paging receiver monitors an appropriate communication channel for its identification code. Starting with the least significant bits first, the paging receiver compares incoming digits on the particular communication channel with its own identification code. As soon as a mismatch occurs, the paging receiver turns itself off in order to conserve power. If the paging receiver determines that a match has been made by the received digital code with the paging receiver identification code, the paging receiver displays the place of origin of the page to the subscriber.

While Andros describes reception of pages from either analog or digital transmitters, Andros does not incorporate the features of a digital cellular telephone system with an existing analog cellular telephone system. More particularly, Andros does not disclose a cellular telephone system in which a mobile telephone may select either a digital or an analog control channel.

SUMMARY OF THE INVENTION

The present invention is directed to a cellular mobile radio telephone system in which multi-mode mobile stations may select either analog or digital control channels. Multi-mode mobile stations are dual-mode and analog mobile stations, as specified in the IS-54 standard, which have been modified to conduct control communications over both analog control channels and digital control channels. Initially, multi-mode mobile stations scan and communicate over digital control channels. If no digital control channel is available, the multi-mode mobile stations scan primary and secondary sets of analog control channels depending upon their capacity to handle communications over digital traffic channels. In this way, multi-mode mobile stations benefit from the advantages of monitoring digital control channels such as battery-saving capabilities resulting from monitoring digital control channels in a sleep mode.

BRIEF DESCRIPTION OF THE DRAWINGS

The present invention will now be described in more detail with reference to preferred embodiments of the invention, given only by way of example, and illustrated in the accompanying drawings, in which:

FIG. 2 is a diagram of a system parameter overhead message that may be used in accordance with the present invention;

FIGS. 3(a)-3(c) comprise a block diagram of a dual-mode mobile station having both analog and digital control channel capabilities that may be used in accordance with the present invention;

FIG. 6 is a chart showing the types of traffic and control channels used by various types of mobile stations.

DETAILED DESCRIPTION OF THE PREFERRED EMBODIMENTS

Figure 1:
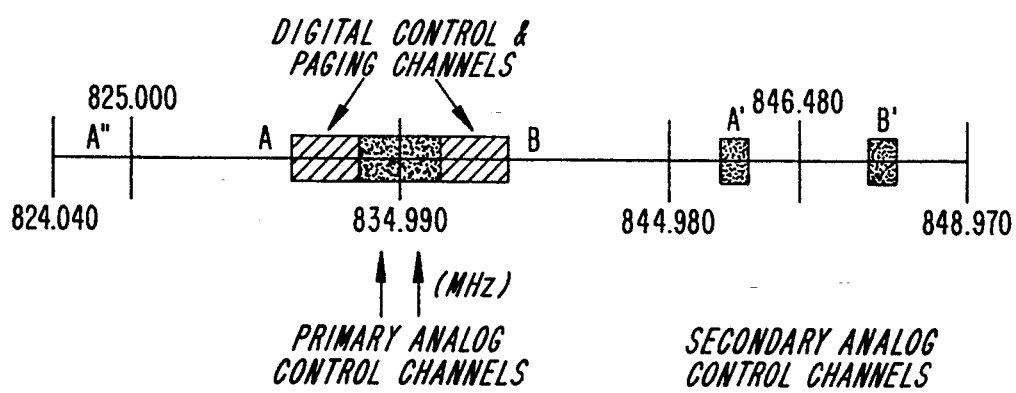
FIG. 1 is one possible set of frequency bands allocated for digital, analog primary, and analog secondary control channels in the mobile telephone frequency band.

A possible assignment of frequencies for a primary and an optional secondary set of analog control channels as well as digital control and paging channels for a cellular telephone system presupposed by the present invention is illustrated in FIG. 1. The frequency bands in FIG. 1 (A, B, A', B', A") are those specified for U.S. cellular telephone systems in the standard EIA/TIA IS-54 for frequency parameters. The space between adjacent communication frequencies is 30 kHz. For example, in system A, 333 frequencies may be established in the frequency range from 825,030 MHz to 834,990 MHz. Similarly, 333 land or base station transmitting frequencies may be established from 870,030 MHz to 879,990 MHz. One pair of such uplink and downlink frequencies may be assigned either to one analog channel or subdivided into several (e.g. three) time slots and assigned to a corresponding number of digital channels. In this exemplary embodiment, system A is a preferred system and system B is a non-preferred system.

In each Metropolitan Statistical Area (there are 305 such areas in the USA), there are two competing cellular service operators. One operator is always the established telephone company in the area, the "wire-line" company, and is referred to as System B. The other operator is an independent company which does not own the telephone network, the "non wire-line" company, and is referred to as System A. In the preferred embodiment, system A is defined as the preferred system.

The frequencies for the primary control channels are those set forth in the published U.S. standard EIA/TIA IS-54. The number of secondary analog control channels may be equal to the number of primary analog control channels, e.g., 21 in each extended frequency band A' and B'. There may be as many as 42 digital control channels with an associated 84 paging channels in each of the frequency bands A and B. Those digital channels not needed as control and paging channels may be utilized as traffic channels. In the preferred embodiment, the digital dedicated control channels occupy the first time slot of a frequency, whereas the remaining time slots on that frequency may be used as paging or traffic channels.

The present invention presupposes in each frequency band (at least in bands A and B) analog control channels as well as an additional set of digital control channels that may be scanned by mobile stations. The original control channels in the analog system will be referred to herein as the primary control channels. The second subset of analog control channels corresponding to frequency bands A' and B' will be referred to as secondary analog control channels. The digital control channels bordering the primary analog control channels will be referred to as digital control channels and digital paging channels.

All overhead messages are sent in a group called an overhead message train (OMT). The first message of the train is the system parameter overhead message (SPOM). FIG. 2 illustrates an example of a system parameter overhead message (SPOM) that may be utilized in conjunction with the present invention. The SPOM is transmitted by a base station on its associated control channel about once a second. The base station transmits the same SPOM over both an analog and a digital control channel simultaneously, but the formats are different. Upon receiving the SPOM, mobile stations adjust to different cellular systems having various parameter values.

The SPOM as implemented on an analog control channel generally consists of two word trains, word 1 and word 2. The $T_1 T_2$ field at the beginning of each word represents an indication of message type, and a $T_1 T_2$ value of "11" indicates an overhead word. Immediately following the type field is the digital color code (DCC) field which identifies the cell or group of cells transmitting the SPOM. Word 1 further includes a system identification field (SID1) for identifying system A or B, an authentication procedure field (AUTH), and a reserve field (RSVD) of bits for future use. The protocol capability indicator field (PCI) is set to an active value, e.g., 1, if the designated control channel can assign digital traffic channels. Should the PCI bit indicate an inactive value, e.g., 0, the control channel can only assign analog traffic channels. A number of additional words coming field (NAWC) is set to a value which is one less than the total number of words in the overhead message train (OMT). An overhead message type field (OHD) of word 1 is set to a value of "110" indicating the first word of the system parameter overhead message. The OHD field of word 2 is set to "111" indicating the second word of the system parameter overhead message. Also included at the end of word 1 and word 2 is a parity field (P) for error detection purposes.

Word 2 includes the following fields: the digital color code (DCC), a serial number field S; an extended address field E; a registration field for home stations (REGH); a registration field for roaming stations (REGR); a discontinuous transmission field DTX; a field (N−1) for indicating the number of paging channels in the system; a read control filler field (RCF); a combined paging/access field (CPA); a field (CMAX−1) for indicating the number of access channels in the system; and an end indication field (END) which is set at "1" to indicate the last word of the overhead message train or set to "0" if it is not the last word.

Figure 3B:
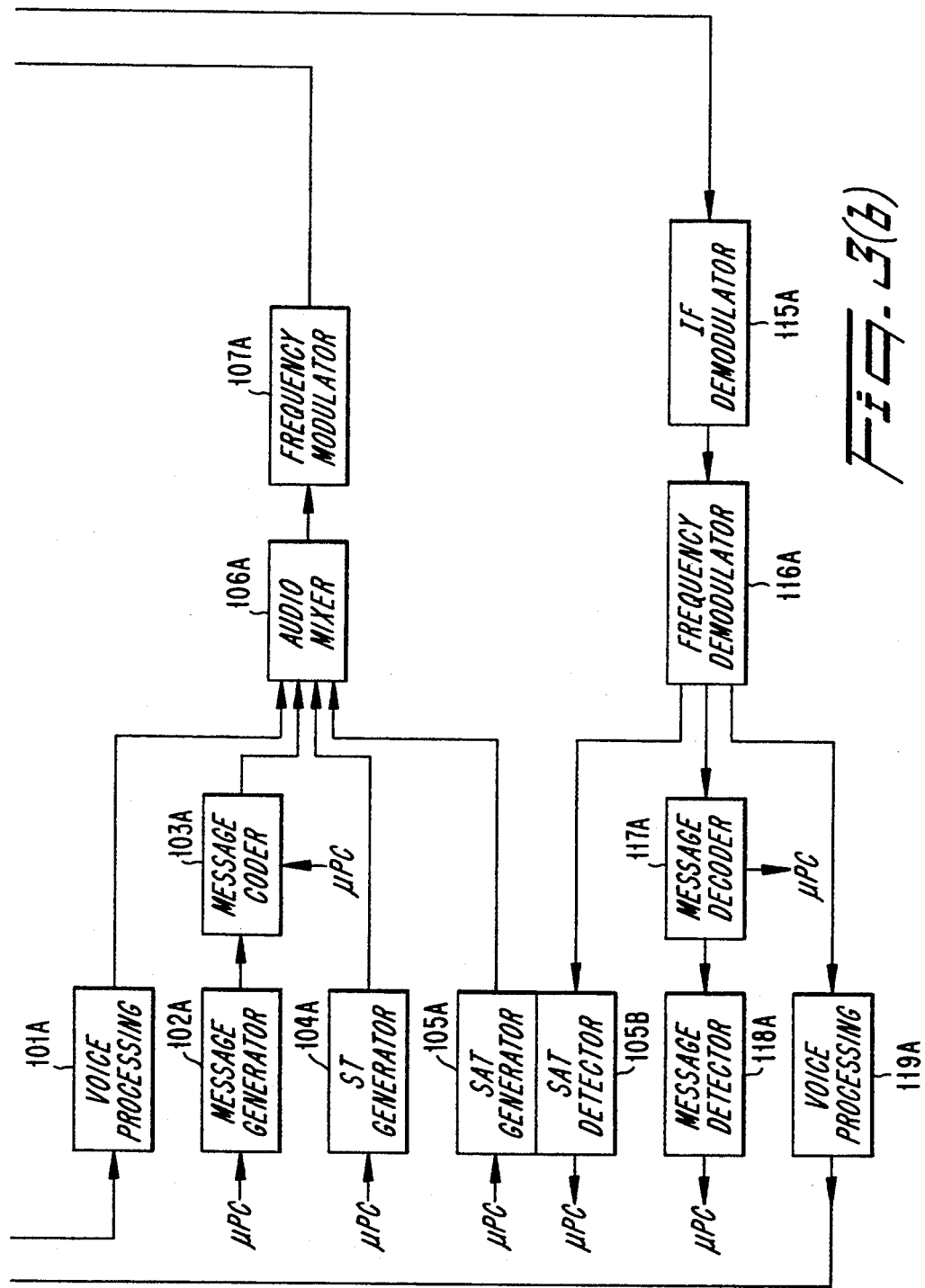
Figure 3C:
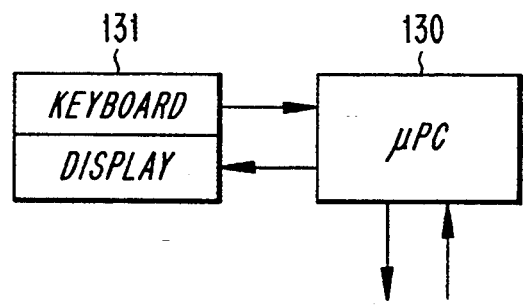

Referring now to FIGS. 3(a), 3(b) and 3(c), one embodiment of a multi-mode mobile station for use in a cellular telephone system that operates in accordance with the present invention is illustrated. With respect to digital traffic communications, i.e., where digitized voice information is transmitted between base and mobile stations, the operation of the system is explained in the context of full-rate transmissions, in which each packet of digital information is interleaved between two spaced time slots in a frame of data. It will be readily appreciated, however, that the invention is equally applicable to other types of cellular radio systems, such as those in which information is transmitted digitally at half rate.

In the digital part of the multi-mode mobile station depicted in FIG. 3(a), speech signals from a microphone 100 are received at an analog-digital mode switch 90 which is controlled by an output signal from a microprocessor controller 130. Depending upon the mode of the mobile station, the microprocessor controller 130 directs the mode switch 90 to connect the microphone output signals to a speech coder 101 for a mobile station operating in a digital mode (digital traffic channel) or to a voice processing unit 101A for a mobile station operating in an analog mode (analog traffic channel).

In the digital mode, the speech coder 101 converts the analog signal from the microphone 100 into a binary data stream. The data stream is divided into data packages, according to the time division, multiple access (TDMA) principle. A fast associated control channel (FACCH) generator 102 generates control and supervision signalling messages that are transmitted from the mobile station to the land-based station. The FACCH message replaces a user frame of speech or data whenever it is to be transmitted. A slow associated control channel (SACCH) generator 103 provides signalling messages that are transmitted over a continuous channel for exchange of information between the base station and the mobile station and vice versa. A fixed number of bits, e.g., twelve, is allocated to the SACCH for each time slot of a message stream. The channel coders 104 are connected to the speech coder 101, FACCH generator 102 and SACCH generator 103 for manipulating the incoming data in order to carry out error detection and correction. The techniques used by the channel coders are preferably convolutional encoding, which protects important data bits in the speech code, and cyclic redundancy check (CRC), wherein the significant bits in the speech coder frame, e.g., twelve bits, are used for computing a 7-bit check.

A two-burst interleaver 106 is coupled to the channel coders 104. The two-burst interleaver 106 is controlled by the microprocessor controller 130 so that, at appropriate times, user information over a particular speech channel is replaced with system supervision messages over the FACCH. Data to be transmitted by the mobile station is interleaved over two distinct time slots. A packet of 260 data bits that constitute one transmitting word, are divided into two equal parts and are allotted to two different time slots. The effects of Rayleigh fading will be reduced in this manner. The output of the two-burst interleaver 106 is provided to the input of a modulo-two-adder 107 so that the transmitted data is ciphered bit-by-bit by logical modulo-two-addition of a pseudo-random bit stream.

The output of the channel coder 104 associated with the SACCH generator 103 is connected to a 22-burst interleaver 108. The 22-burst interleaver 108 interleaves data transmitted over the SACCH over 22 time slots, each burst of SACCH data consisting of 12 bits of information.

The mobile station further includes a Sync Word—DVCC generator 109 for providing the appropriate synchronization word (Sync Word) and DVCC (digital verification color code) which are to be associated with a particular connection. The Sync Word is a 28 bit word used for time slot synchronization and identification. The DVCC is an 8-bit code sent by the base station to the mobile station and vice-versa for assuring that the proper channel is being decoded.

A burst generator 110 generates message bursts for transmission by the mobile station. The burst generator 110 is connected to the outputs of the modulo-two-adder 107, the 22-burst interleaver 108, the Sync Word/DVCC generator 109, an equalizer 114, and a control channel message generator 132, to integrate the various pieces of information from these respective units into a single bit stream. For example, according to the published U.S. standard EIA/TIA IS-54, a message burst comprises data (260 bits), SACCH (12 bits), Sync Word (28 bits), coded DVCC (12 bits), and 12 delimiter bits, combined for a total of 324 bits. Under the control of the microprocessor 130, two different types of message bursts are generated by the burst generator 110: control channel message bursts from the control channel message generator 132 and voice/traffic message bursts.

The control channel message generator 132 generates digital control messages for transmission over a digital control channel. Digital control channel messages are received by the control channel message detector 133. Only the multi-mode mobile stations have this capability to utilize digital control channels. It should be noted that FIGS. 3(a), 3(b) and 3(c) also show the essential hardware blocks for a dual-mode mobile station. Dual-mode mobile stations, however, do not use digital control channels and therefore do not have the control channel message generator 132 and detector 133 and the associated software in the microprocessor controller 130. Unlike the control messages sent over the FACCH, which replace traffic bursts on the traffic channels, the control message bursts generated by the control channel message generator 132 are transmitted over a digital control channel and do not replace any traffic bursts.

The transmission of a burst, equivalent to one time slot, is synchronized with the transmission of other time slots, which together make up a frame of information. For example, under the U.S. standard, a frame comprises three full-rate transmission time slots. The transmission of each burst is adjusted according to timing control provided by the equalizer 114. Due to time dispersion, an adaptive equalization method is provided in order to improve signal quality. For further information regarding adaptive equalization techniques, reference is made to U.S. patent application Ser. No. 315,561, filed Feb. 27, 1989, now U.S. Pat. No. 5,088,108 and assigned to the same assignee. The text of this application is incorporated herein by reference. Briefly, the base station functions as the master and the mobile station is the slave with respect to frame timing. The equalizer 114 detects the timing of an incoming bit stream from the base station and synchronizes the burst generator 110. The equalizer 114 also checks the Sync Word and DVCC for identification purposes.

The burst generator 110 is coupled to a frame counter 111 and to the equalizer 114. The frame counter 111 updates a ciphering code utilized by the mobile station for each transmitted frame, e.g. once every 20 ms. A ciphering unit 112 is provided for generating the ciphering code utilized by the mobile station. A pseudo random algorithm is preferably utilized. The ciphering unit 112 is controlled by a key 113 which is unique for each subscriber. The ciphering unit 112 consists of a sequencer which updates the ciphering code.

In a digital mode, the burst produced by the burst generator 110, is forwarded to an RF modulator 122 through an analog/digital mode switch 96 that is controlled by the microprocessor controller 130. The RF modulator 122 is operable for modulating a carrier frequency according to the $\pi/4$-DQPSK method ($\pi/4$ shifted, Differentially encoded Quadrature Phase Shift Keying). The use of this technique implies that the information is differentially encoded, i.e., 2-bit symbols are transmitted as four possible changes in phase; $\pm\pi/4$ and $\pm 3\pi/4$. The transmitter carrier frequency supplied to the RF modulator 122 is generated by a transmitting frequency synthesizer 124 in accordance with the selected transmitting channel. The modulated carrier is transmitted via an antenna 99 through a duplex filter 140. The duplex filter 140 is used for simultaneous transmission and reception via the same antenna 99 on the communications channel which is necessary in analog mode. The carrier is amplified by a power amplifier 123. The RF power emission level of the amplifier is selected on command by a microprocessor controller 130.

A receiver carrier frequency signal is generated in accordance with the selected receiving channel by receiving frequency synthesizer 125. Incoming radio frequency signals are received by a receiver 126, and signal strength is measured by a signal level meter 129. The received signal strength value is sent to the microprocessor controller 130. An RF demodulator 127, which receives the receiver carrier frequency signal from the receiving frequency synthesizer 125 and the radio frequency signal from the receiver 126, demodulates the radio frequency carrier signal, thus generating an intermediate frequency. The intermediate frequency signal is demodulated by an IF demodulator 128 to restore the original $\pi/4$-DQPSK—modulated digital information.

The restored information provided by the IF demodulator 128 is supplied to the equalizer 114. A symbol detector 115 converts the received two-bit symbol format of the digital data from the equalizer 114 to a single-bit data stream. The symbol detector 115 in turn produces three distinct output signals. First, control channel messages are sent to a control message detector 133 which supplies detected control channel information to the microprocessor controller 130. Second, any speech data/FACCH data is supplied to a modulo-two adder 107 and a two-burst deinterleaver 116. The speech data/FACCH data is reconstructed by assembling and rearranging information from two time slots of the received data. Third, the symbol detector 115 supplies SACCH data to a 22-burst deinterleaver 117. The 22-burst deinterleaver 117 reassembles and rearranges the SACCH data over 22 consecutive frames.

The two-burst deinterleaver 116 provides the speech data/FACCH data to two channel decoders 118. The convolutionally encoded data is decoded using the reverse of the above-mentioned coding principle. The received cyclic redundancy check (CRC) bits are checked to determine if any error has occurred. The two-burst deinterleaver 116 also detects the distinction between the speech channel and any FACCH information, and directs the decoders 118 accordingly. A speech decoder 119 processes the received speech data from the channel decoder 118 in accordance with a speech decoder algorithm (e.g. VSELP) and generates the received speech signal. The analog speech signal is enhanced using a conventional filtering technique and input to an analog/digital mode switch 92. Under the control of the microprocessor controller 130, when the system is operating in a digital mode, the mode switch 92 transmits the speech signal to a speaker 94. Messages on the fast associated control channel are detected by FACCH detector 120, and the information is transferred to the microprocessor controller 130.

The output of the 22-burst deinterleaver 117 is provided to a separate channel decoder 118. Messages on the slow associated control channel are detected by SACCH detector 121, and that information is transferred to the microprocessor controller 130.

The microprocessor controller 130 controls the mobile station activity and the base station communication, and also handles the terminal keyboard input and display output 131. Decisions by the microprocessor controller 130 are made in accordance with received messages and measurements. The keyboard and display unit 131 enable information to be exchanged between the user and the base station.

In contrast to the multi-mode mobile station operating in a digital mode as described above, a multi-mode mobile station operating in an analog mode will now be described in relation to FIGS. 3(a), 3(b) and 3(c). An analog signal generated by a human voice is detected on the microphone 100 and connected through the analog/digital mode switch 90 to a voice processing unit 101A. The voice processing unit 101A carries out a number of processing functions designed to frequency modulate the carrier signal. These processing stages include signal compression, pre-emphasis, deviation limit filtering, and post-deviation limit filtering. As these signal processing stages are well known in the cellular telephone art, no further discussion of these stages is necessary. A message generator 102A receives digital data messages from the microprocessor controller 130 in conjunction with signalling between the mobile station and the base station. These messages are transmitted both on the reverse control channel (RVCC) and the reverse voice channel (RVC) from the mobile station to the base station. A 36-bit data message generated by the message generator 102A is coded with a Bose-Chandhuri-Hocqenghem code (BCH) to facilitate error protection and correction. This code is used to correct single-bit errors in the data stream. Only the error pattern of two or more errors will be detected. The error-correcting code adds 12 bits to the 36-bit data word, thus increasing the word length to 48 bits.

Each analog control channel message begins with a bit-sync sequence, a word-sync sequence, and a coded digital color code (CDCC). The CDCC is used to assure that the proper control channel is decoded. Similar to the control channel messages, the voice channel messages are also provided with a bit-sync sequence and a word-sync sequence.

The signalling tone (ST) generator 104A is used for signalling from the mobile station to the base station, e.g. during call set up and release. Under the control of the microprocessor controller 130, the ST is generated as a digital data message and sent as a tone on the reverse voice channel (RVC). The supervisory audio tone (SAT) generator/detector 105A, 105B is used to ensure that the correct voice channel is being detected. The SAT is transmitted continuously from the base station, detected by the SAT detector 105B in the mobile station, and looped back from the SAT generator 105A in the mobile station to the base station during voice transmission. If the expected SAT is detected in the SAT detector 105B, the transmitted voice channel carrier will be modulated with that SAT. If the SAT detected does not coincide with the SAT assigned to the appropriate voice channel, the receiver is muted.

Output signals generated by the voice processing unit 101A, the message coder 103A, the ST generator 104A, and the SAT generator 105A are received by an audio mixer 106A. The audio mixer 106A filters and combines the received signals in order to limit the carrier bandwidth and form a common signal. During speech transmission, the speech signal is modulated by the SAT. During transmission of data messages, transmission of the SAT signal is suspended. However, when the ST signal is transmitted, the SAT signal must also be transmitted. The information signal generated by the audio mixer 106A is used to frequency modulate the carrier signal in the frequency modulator 107A. The frequency modulated carrier is connected to the radio frequency modulator 122 by way of the microprocessor-controlled analog/digital mode switch 96. By mixing the modulated carrier with the output signal from the transmitting frequency synthesizer 124 in the RF modulator 122, the transmitted carrier frequency is generated in accordance with the transmitting channel selected by the microprocessor controller 130. As in the digital mode, the output signal from the RF modulator 122 is amplified in the power amplifier 123, filtered in the duplex filter 140 to prevent the transmitted radio signals from interfering with the received radio signals, and transmitted over an antenna 99.

Messages are transmitted/received over analog control or analog traffic channels using the message generator 102A and message detector 118A. Messages are transmitted over digital traffic channels via the FACCH and SACCH generators 102,103 and received via the FACCH and SACCH detectors 120, 121.

It will be appreciated that in analog cellular communications, each communications channel corresponds to a unique frequency in the cell. That several communications channels can use a single frequency in digital cellular communications is one of the reasons why digital communications capabilities are desirable.

A radio signal received from a base station over the antenna 99 is filtered in the duplex filter 140 and received in a receiver 126 for filtering and amplification. The output signal from the receiver 126 is mixed with the radio frequency carrier signal generated by the receiver frequency synthesizer 125 to generate an intermediate frequency signal. That intermediate frequency signal is connected to an intermediate frequency demodulator 115A by way of an analog/digital mode switch 98 controlled by the microprocessor controller 130. The intermediate frequency demodulator 115A demodulates the IF signal and restores the original, frequency modulated signal. The frequency demodulator 116A extracts from the frequency modulated signal messages data, the SAT, and speech. In the message decoder 117A, the received messages are decoded according to the BCH code. If the coding indicates any bit errors, the microprocessor controller 130 is informed of such errors. A decoded message is detected in the message detector 118A and transmitted to the microprocessor controller 130. The voice processing unit 119A processes the voice signals from the frequency demodulator 116A into an analog signal. The voice processing unit 119A includes conventional de-emphasis and expansion capabilities. As mentioned above, the SAT signal is detected in the SAT detector 105B and transmitted to the microprocessor controller 130.

Because the present invention relates primarily to mobile stations, a detailed description of the base station is believed unnecessary. The multi-mobile stations according to the present invention include dual-mode mobile stations or analog mobile stations with the added capabilities for signalling on a digital control channel. The multi-mode mobiles may be used in cellular systems together with analog only, digital only and dual-mode mobile stations by selecting the appropriate communication mode. It will be recognized by those skilled in the art that the base station and mobile station must function in at least one common mode of operation. Accordingly, the microprocessor controller 130 of the mobile station sets each analog-digital mode switch 90, 92, 96, and 98 to the appropriate mode. The microprocessor controller 130 then activates those switches electrically. When an analog or digital (voice or control) channel is active or expected to become active in the air interface, the switches 90, 92, 96 and 98 are all connected either to the analog or to the digital subsystem respectively. Therefore, these switches may be thought of as four sets of "contacts" on the same "relay" even though the switches are semiconductor switches in the preferred embodiment.

Two types of digital control channels may be used in multi-mode mobiles: "bi-directional" and "downlink only." Bi-directional multi-mode mobiles have both the control channel message generator 132 and detector 133 for sending control information to and receiving control information from the base station over the digital control channel. Downlink only multi-mode mobile stations, having only a control channel message detector 133, are lower in cost than the bi-directional multi-mode mobiles because the control channel message generator hardware is not included. Nonetheless, by using the downlink digital control channel from the base station to the mobile, the downlink only multi-mode mobiles can utilize the battery-saving sleep mode.

In multi-mode mobile stations, the antenna and battery are used commonly by both the analog and digital portions. During a sleep state, a multi-mode mobile station is deactivated if that mobile station is not being paged, as will be described further below, and battery power is conserved. This battery-saving sleep procedure cannot be used by analog mobile stations because they do not have digital control channel capabilities. During the sleep mode, if that multi-mode mobile is paged by the base station, it "wakes up", rescans the analog control channels, selects the first or second strongest analog control channels, and proceeds to respond to the page in the conventional manner in an analog cellular system. Although both bi-directional and downlink multi-mode mobiles may use the sleep mode, bi-directional multi-mode mobile stations also benefit from other uplink digital services such as short message service and authentication.

The digital control channel occupies the first time slot of a dedicated frequency divided into three time slot frames. The second and third time slots of this dedicated frequency may be used as paging channels. In the present invention, the term "dedicated" means a fixed frequency and a fixed time slot unique to each cell in a cluster of cells. Both the bi-directional and downlink multi-mode mobiles use this digital control channel in the same fashion with the exception that the downlink multi-mode mobile has no capability to transmit digital control information in the uplink direction over the digital control channel.

The dedicated control channel broadcasts the overhead message train (OMT) which includes the SPOM. The SPOM informs the mobile stations within the cluster of cells of the system identity as well as other overhead-related data. When an incoming call for a particular mobile station is received by the base station, the base station pages the multi-mode mobile stations over a digital and an analog paging channel. Downlink multi-mode mobile stations having only a digital control channel receiver initiate uplink communications from the mobile station to the base station using an analog access channel. Preferably, downlink, dedicated, digital control channel transmissions should be continuous to allow the mobile stations to asynchronously scan and measure signal strength and select the strongest or second strongest digital control channel. In addition, the transmission of the dedicated digital control channel is easily justified given that transmission of paging information over the paging channels during time slots 2 and 3 of that same frequency is already required.

Figure 4:
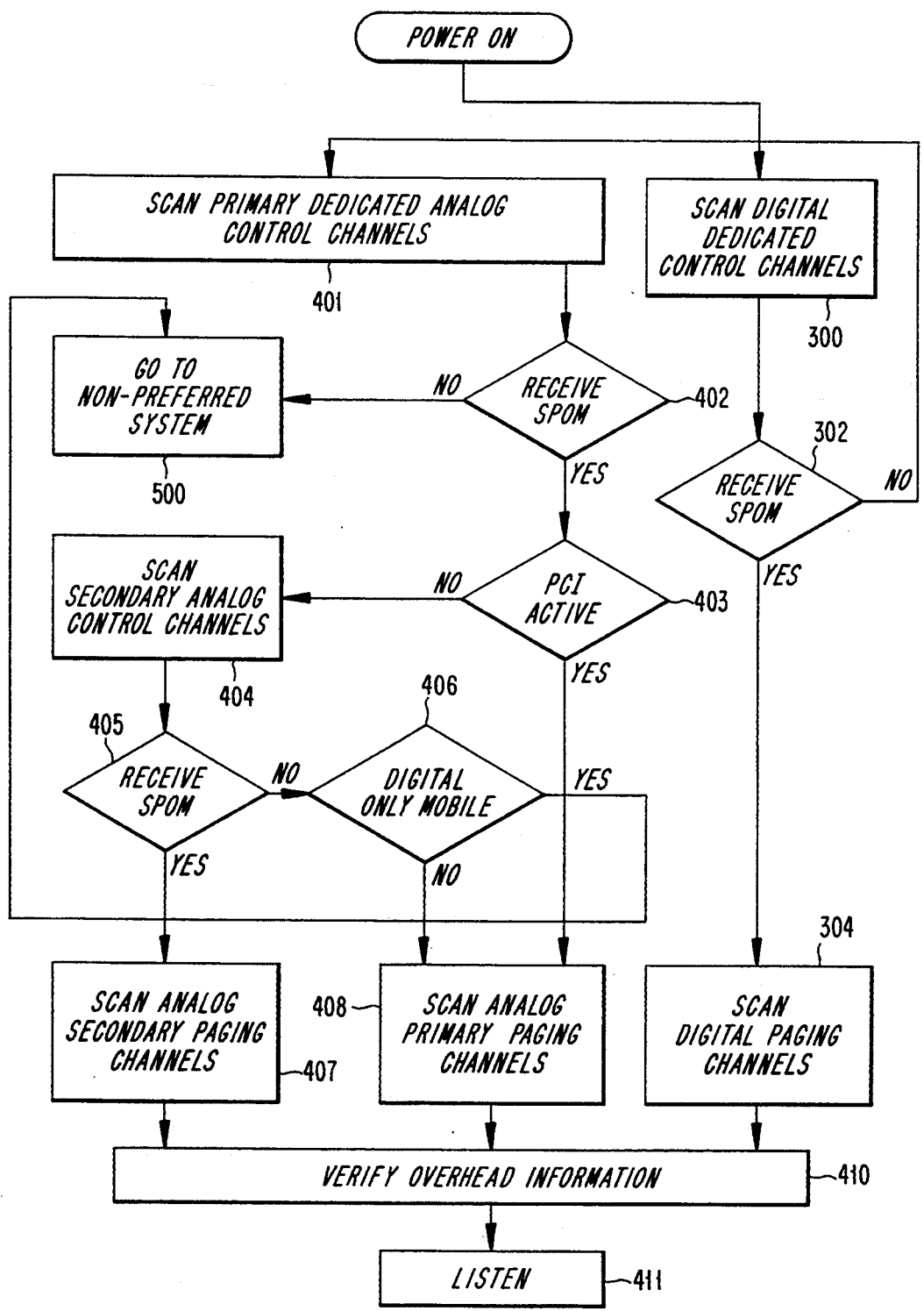
FIG. 4 is a flow chart outlining a control procedure selection of digital, analog primary, or analog secondary control channels for a multi-mode mobile station capable of using both digital and analog control and traffic channels.

The call connection procedure for determining which set of control channels a multi-mode mobile station will use will now be described in conjunction with FIG. 4. Upon turning on the power, the multi-mode mobile station scans frequencies having dedicated digital control channels. The strongest is selected. Time slot TS1 of that selected frequency F, corresponding to the digital control channel, is read at step 300. If a digital control channel on a frequency having the greatest signal strength is unavailable, the dedicated digital control channel frequency having a next greater signal strength will be read by the mobile station. Flow control proceeds to decision block 302 to determine whether or not the mobile station has received the system parameter overhead message (SPOM) over the selected digital control channel at decision block 302. If the mobile station has received the system parameter overhead message (SPOM), control proceeds to step 304 where the mobile station scans the digital paging channels corresponding, for example, to time slots TS2 and TS3 of frequency F to select a paging channel. At step 410, the mobile station enters a verify overhead information state where the mobile station verifies among other things the identity of the base station generating the paging channel to which the mobile station is tuned. Then, at step 411, the mobile listens to the paging channel to determine if it has been paged.

If the multi-mode mobile station does not receive a recognizable SPOM from the strongest or next stronger of the digital control channels which the mobile station has scanned and tuned to, program control proceeds to step 401, where the mobile station scans the primary dedicated analog control channels generated from the preferred system A. The mobile station examines the signal strength of each of the primary analog control channels so that only the control channel with the strongest or next stronger signal will be scanned and tuned to by the mobile station. At step 402, the mobile station determines whether it has actually received the system parameter overhead message (SPOM) train associated with the primary control channel being read. The mobile station uses the value given in the number of additional words coming (NAWC) field of the system parameter overhead message (SPOM) train to determine that all messages of the overhead message train have been received by the mobile station. If the mobile station does not receive a recognizable overhead message from the strongest or second strongest of the control channel which the mobile station is tuned to, the mobile station will default and begin to scan control channels from a non-preferred system at step 500. Otherwise, the mobile station determines that a recognizable overhead message train has been received from the preferred system A on the strongest or second strongest primary control channel being read.

At step 403, the mobile station makes another determination as to whether the reserved PCI-bit of the system parameter overhead message train is in an active or inactive state. In the situation where the PCI-bit is in an active state, e.g., a value of 1, the mobile station will begin to scan the analog primary paging channels at step 408. At step 410, the mobile station enters a verify overhead information state where the mobile station verifies among other things the identity of the base station generating the control channel being read. At step 411, the mobile station enters an idle state to listen to the selected paging channel for any incoming calls. Steps 410 and 411 differ somewhat when the paging channel is digital rather than analog. A multi-mode mobile using the digital control and paging channels enters the sleep mode described above, rather than enter an idle listening mode.

If the mobile station at step 403 determines that the PCI-bit is in an inactive state, e.g., a value of 0, the mobile station begins to scan a secondary set of analog control channels associated with a second preferred system, for example, system A' in step 404. At this point, the mobile station examines the signal strength of each of the secondary dedicated analog control channels, and only the control channel with the strongest or second strongest signal strength will be read by the mobile station. At step 405, the mobile station determines whether a recognizable system parameter overhead message SPOM associated with the secondary control channel being read by the mobile station is received. If a recognizable SPOM train associated with the secondary analog control channel being read is not received at the mobile station, two alternative operations are possible at step 406. First, if the mobile station scanning the secondary control channels has only digital communication capabilities, the mobile station will defer to scanning primary control channels associated with a non-preferred system B. Second, in the event that the mobile station scanning the secondary control channels has analog or dual-mode communication capabilities, the mobile station will begin scanning the primary paging channels in order to select a primary analog paging channel at step 408. It should be noted that step 406 takes into account the possibility of a "digital traffic only mobile" as referred to in the IS-54 standard. Such mobiles would communicate only over digital traffic channels and would use analog control channels. The digital traffic only mobiles, however, must be distinguished from purely digital mobiles operating over digital traffic and control channels.

In the case that the mobile station at step 405 receives a proper system parameter overhead (SPOM) message, the mobile station will begin scanning the analog secondary paging channels in order to select a secondary paging channel at step 407.

By providing dual-mode mobile stations that communicate over analog control channels with the ability to monitor a digital control channel, these multi-mode mobile stations offer enhanced functionality that was heretofore available only with purely digital mobile stations. One function offered by these enhanced analog and dual-mode mobile stations, for example, is the ability to operate in a sleep mode and thereby conserve power. In the sleep mode, a mobile station monitors a digital paging channel. When access to the base station is performed for registration, page reception and response, originating a call, or other acknowledgement, the multi-mode mobile station leaves its sleep state and communicates with the base station via a digital access channel belonging to that base station, provided that the multi-mode mobile is bi-directional and therefore equipped with a control channel message generator 132. Otherwise, downlink multi-mode mobiles communicate with the base station via an analog access channel. When a call is completed, the multi-mode mobile station returns to a sleep state and scans the digital paging channels in the sleep mode. In other words, the multi-mode mobile station uses the digital control channel in order to take advantage of the sleep mode. Both the bi-directional and downlink type mobiles may use analog control channels for all other types of functions such as registration, etc. Of course, these other functions may be accomplished over the digital control channel by bi-directional mobiles.

Figure 5A:
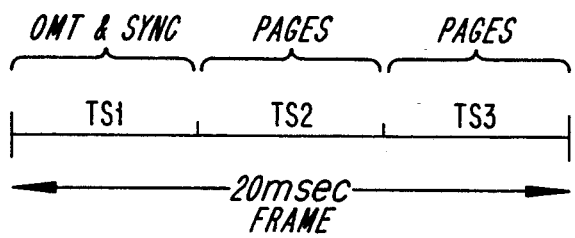
FIGS. 5(a)-5(b) illustrate signal transmissions from the land-based system on a digital paging channel for conserving battery power in mobile telephones.
Figure 5B:
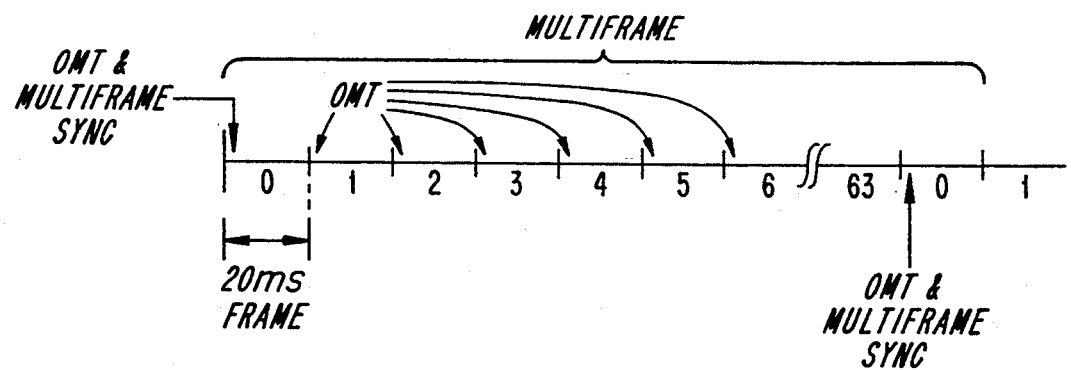

The timing of the messages transmitted by base stations on a digital control channel to provide the sleep mode for the multi-mode mobile stations will now be described in conjunction with FIGS. 5(a) and 5(b).

In general, a number of consecutively transmitted frames on the digital control channel form a multiframe. Each mobile station is assigned to one of the frames in the multiframe, and pages to that mobile station are transmitted only during its assigned frame. As a result, the mobile station can "sleep", i.e., turn its receiver off, during the other frames, to thereby conserve power. In a preferred embodiment of the invention, each multiframe consists of 64 frames with each frame having a duration of 20 ms. Thus, each multiframe is 1.28 seconds in length, and the mobile station is only required to be "awake" during 20 ms of this time. The 20 msec frame shown in FIG. 5(a) consists of three time slots, TS1, TS2 and TS3. In TS1, the base station continuously transmits the overhead message train which contains basically the same system parameter overhead (SPOM) information as the overhead message train specified in the IS-54 for the analog control channel. Along with the SPOM in the first time slot TS1 is a multiframe synchronization signal, shown in FIG. 5(b), that indicates the start of a 64-frame long multiframe. Alternatively, the SPOM includes frame number message (FNM) information indicating the actual position of a particular frame within the multiframe.

In the second and third time slots TS2 and TS3, the base station transmits paging messages corresponding to incoming calls for the mobile stations. Each paging message in a single frame includes a 34-bit mobile identification number (MIN) assigned to each mobile station plus some administration and checking bits, e.g., cyclic redundancy check (CRC). The MIN represents in binary form the 10-digit directory telephone number assigned to each mobile station.

In the IS-54, one 20 ms time slot contains a sufficient number of bits to enable three mobile stations to be paged during that time slot. If a particular time slot contains the maximum number of pages (for example, three pages per time slot), the mobile stations belonging to the group in question but not among the mobile stations paged in the time slot TS2 can read the three additional pages allocated in the subsequent time slot TS3. If there are more than six simultaneous pages, those pages in excess of six are queued at the base station.

When a multi-mode mobile station is paged on a digital control channel, it switches to an analog paging channel to receive the page again. After the mobile station has finished the activity initiated by a page, the mobile station reverts to the sleep mode as described above. During the sleep mode, the mobile station must read the overhead message train (OMT) periodically, e.g., every 25 seconds. That reading of the OMT may be initiated by the mobile station itself or by the base station ordering the mobile station to read the OMT. The mobile station reads the OMT periodically for new cell registration or for resynchronization to the frame number messages (FNM).

In a preferred embodiment of the invention, the assignment of the mobile stations to a particular frame within a multiframe is achieved by reference to the mobile identification number (MIN) of the mobile station. For example, if a multiframe is 64 frames in length, the assigned frame for any given mobile station can be determined by the six least significant bits in its MIN. With this approach, every mobile station inherently defines its assigned frame within a multiframe. Thus, as soon as a mobile station registers within a cell, its frame assignment is automatically known by both the base station and the mobile station, thereby avoiding the need to specifically exchange this kind of information during initial communication between the two stations.

FIG. 6 summarizes the different capabilities of different types of mobile stations described in this application. Category I shows three types of mobile stations under the IS-54 standard: analog, digital, dual-mode. The analog mobile station uses analog traffic channels and an analog control channel. The digital mobile station uses digital traffic channels and an analog control channel. The dual-mode mobile station uses either analog or digital traffic channels and an analog control channel. By way of contrast, in category II, a purely digital mobile, under the EIA/TIA IS-7X standard being developed, uses both digital traffic and control channels. It is interesting to note that none of the mobiles in categories I and II can utilize both analog and digital control channels.

In category III, the various types of multi-mode mobile stations which are the subject of the present invention are shown under the IS-54 and the coming IS-7X standards. An analog mobile station which has been modified to include a control channel message detector 133, i.e. a downlink multi-mode mobile, uses analog traffic channels as well as analog and digital control channels. This downlink multi-mode mobile can only receive messages over the digital control channel. The dual-mode type of multi-mode mobile station may be either bi-directional or downlink. The bi-directional multi-mode mobile station can use either analog or digital traffic channels and analog or digital control channels. The downlink dual-mode multi-mode mobile station, like the analog multi-mode mobile, may only receive control communications over the digital control channel. It should be noted that the digital mobile station may be modified to become a digital multi-mode mobile station that incorporates analog circuitry to provide the option of using both analog and digital control channels.

From the foregoing description of the specific embodiment, others can, by applying current knowledge, readily modify and/or adapt for various applications such specific embodiments without departing from the general nature of the invention, and, therefore, such adaptations and modifications should and are intended to be comprehended within the meaning and usage of equivalents of the disclosed embodiments. It is to be understood that the terminology employed herein is for the purpose of description and not of limitation.

What is claimed is:

1. A multi-mode mobile radio telephone station for communicating over analog or digital traffic channels and control communications over an analog or a digital control channel and for interacting with a plurality of base stations where at least some of said base stations conduct control communications with said mobile station over said analog control channel and at least some of said base stations conduct control communications with said mobile station over said digital control channel, said mobile station comprising:
   (a) a mode selection switch for switching said mobile station between an analog mode and a digital mode, said switch being initially set to its digital mode for receiving digital control communications over said digital control channel from one of said base stations.;
   (b) means for scanning a set of digital control channels, received from said digital control communications when said mobile station is switched to a digital mode;
   (c) first overhead message receiving means for determining if one of said digital control channels is available;
   (d) means for conducting control communications with one of said base stations over a digital control channel associated with this base station if said one of the digital control channels is available;
   (e) means for scanning a first set of analog control channels if none of said digital control channels is available;
   (f) second overhead message receiving means for determining if one of said analog control channels is available; and
   (g) means for conducting control communications with one of said base stations over an analog control channel associated with this base station if said one of the analog control channels is available.

2. A multi-mode mobile radio telephone station for interacting with a plurality of base stations where at least some of said base stations conduct control communications with said mobile station over analog control channels and at least some of said base stations conduct control communications with said mobile station over digital control channels, said mobile station comprising:
   a mode selection switch for switching said mobile station between an analog mode and a digital mode;
   means for conducting control communications with one of said base stations over an analog control channel associated with this base station when said mobile station is switched to an analog mode;
   means for conducting control communications with one of said base stations over a digital control channel associated with this base station when said mobile station is switched to a digital mode;
   means for scanning a set of digital control channels, overhead message receiving means for determining if one of said digital control channels is available;
   means for scanning a first set of analog control channels if none of said digital control channels is available;
   detecting means, connected to said first set of analog control channel scanning means, for detecting at least one indicating bit which indicates whether or not a first preferred transmission system has digital traffic channel capabilities;
   means for scanning a set of primary analog paging channels in response to said indicating bit indicating that said first preferred transmission system has digital traffic channel capabilities; and
   means for scanning a second set of analog control channels in response to said indicating bit indicating that said first preferred transmission system does not have digital traffic channel capabilities.

3. A system according to claim 2, said mobile station further comprising:
   means for receiving overhead messages over said first or second set of analog control channels, and
   means for scanning control channels associated with a non-preferred transmission system in the event that an overhead message is not received from either said first or said second set of analog control channels.

4. In a cellular communications system for communicating over analog and digital traffic channels and having at least one multi-mode mobile radio telephone station and a plurality of base stations wherein control communications may be conducted over analog control channels and digital control channels, a method comprising:
   (a) switching said mobile station to a digital mode;
   (b) initiating control communications with a base station over one of said digital control channels, by scanning a set of digital control channels to determine if one of said digital control channels is available;
   (c) conducting control communications over a digital control channel associated with this base station if said one of the digital control channels of said base station is available;
   (d) initiating control communications with said base station over one of said analog control channels by scanning a first set of analog control channels when none of said digital control channels is available, after switching said mobile station to an analog mode; and
   (e) conducting control communications with one of said base stations over an analog control channel associated with this base station if said one of the analog control channels is available;
   wherein an available analog or digital control channel is used to assign the analog and digital traffic channels.

5. A cellular radio telephone communications system, comprising:
   a mobile switching center;
   plural base stations connected to said mobile switching center, for receiving and transmitting speech information and control information; and
   plural mobile radio telephone stations, including at least one multi-mode mobile station including:
   means for receiving speech and data information from a first base station over a voice channel;
   means for transmitting speech and data information to said first base station over said voice channel;
   means for receiving and decoding control information in an analog format from said first base station over a first control channel; and
   means for receiving and decoding control information in a digital format from said first base station over a second control channel;
   wherein said first base station transmits said control information in a digital format over said second control channel through a series of time frames, and each mobile station only monitors said control information over said second control channel during one of said time frames associated with said mobile station, wherein each mobile station is assigned a mobile identification number and a portion of said number defines its associated time frame.

6. A cellular radio telephone communications system, comprising:

a mobile switching center;

plural base stations connected to said mobile switching center, for receiving and transmitting speech information and control information; and plural mobile radio telephone stations, including at least one multi-mode mobile station including:

means for receiving speech and data information from a first base station over a voice channel;

means for transmitting speech and data information to said first base station over said voice channel;

means for receiving and decoding control information in an analog format from said first base station over a first control channel; and means for receiving and decoding control information in a digital format from said first base station over a control channel;

wherein said first base station transmits said control information in a digital format over said control channel through a series of time frames, and each mobile station only monitors said control information over said [second]control channel during one of said time frames associated with said mobile station, wherein during time frames other than said associated time frame, said mobile station deactivates to conserve power.

7. A cellular communications system for accommodating radio communication between multi-mode mobile stations on analog or digital traffic channels and using digital and analog control channels and a plurality of base stations, where at least some of said base stations conduct control communications over analog control channels and at least some of said base stations conduct control communications over digital control channels, each of said mobile stations comprising:

means for scanning a set of digital control channels to detect if any such digital control channel is being transmitted from an associated base station;

means for determining if a recognizable overhead message is received by said mobile station on said digital control channel;

means for scanning a set of digital paging channels if said overhead message is received; and means for scanning a set of primary analog control channels if said recognizable overhead message is not received, wherein said base stations may transmit control information over analog control channels or digital control channels, and wherein an available analog or digital control channel is used to assign the analog and digital traffic channels.

8. The system according to claim 7, wherein said multi-mode mobile stations switched to an analog mode monitor analog control channel communications from said base stations and said multi-mode mobile stations switched to a digital mode monitor digital control channel communications from said base stations.

9. The system according to claim 7, wherein downlink multi-mode mobile stations have means for receiving control information on said digital control channel.

10. The system according to claim 7, wherein bi-directional multi-mode mobile stations have means for receiving and transmitting control information on said digital control channel.

11. The system according to claim 7, wherein said digital control and paging channels are assigned time slots on the same frequency.

12. The system according to claim 7, each of said multi-mode mobile stations conducting control communications over said digital control channels further comprising:

means for periodically scanning paging information on said digital paging channels for a predetermined number of digits, said predetermined number being substantially less than a total number of digits in said paging information;

means for comparing said predetermined number of digits to corresponding digits of an identification code associated with each mobile station;

means for deactivating mobile station power if an output signal from said comparing means indicates that there was no match between the predetermined number of digits and the corresponding identification code digits; and means for periodically reactivating mobile station power and scanning said set of digital control channels.

13. A cellular communications system for accommodating radio communication between multi-mode mobile stations using digital and analog control channels and a plurality of base stations, where at least some of said base stations conduct control communications over analog control channels and at least some of said base stations conduct control communications over digital control channels, each of said mobile stations comprising:

means for scanning a set of digital control channels to detect if any such digital control channel is being transmitted from an associated base station;

means for determining if a recognizable overhead message is received by said mobile station on said digital control channel;

means for scanning a set of digital paging channels if said overhead message is received; and means for scanning a set of primary analog control channels if said recognizable overhead message is not received;

wherein said digital control and paging channels are assigned time slots on the same frequency, and wherein said frequency includes a plurality of frames, each frame including three time slots with a first time slot being reserved for said digital control channel and a second and third time slot being reserved for said digital paging channels organized in multiple frames.

14. The system according to claim 13, wherein said multiple frame includes sixty-four frames and said synchronization signal indicates the beginning of each multiple frame.

15. The system according to claim 13, wherein said second and third time slots contain paging information for a plurality of different mobile stations.

16. The system according to claim 13, wherein paging information is distributed over said second and third time slots in each frame of said multiple frame and excess paging information that can not be communicated in a particular multiple frame is queued at said base station.

17. A mobile station for use in a cellular radio telephone communication system having analog or digital traffic channels and analog and digital control channels, comprising:

means for transmitting and receiving speech and data information over said analog and digital traffic channels;

means for receiving and decoding control information transmitted over an analog control channel in an analog format; and means for receiving and decoding control information that is transmitted over a digital control channel in a digital format;

a mode selection switch for switching a mobile station between an analog mode and a digital mode, said switch being initially set to its digital mode for receiving digital control communications over said digital control channel from a base station;

means for scanning a set of digital control channels, received from said digital control communications when said mobile station is switched to a digital mode;

first overhead message receiving means for determining if one of said digital control channels is available;

means for conducting control communications with one of said base stations over a digital control channel associated with this base station if said one of the digital control channels is available;

means for scanning a set of analog control channels if none of said digital control channels is available;

second overhead message receiving means for determining if one of said analog control channels is available; and means for conducting control communications with one of said base stations over an analog control channel associated with this base station if said one of the analog control channels is available.

18. The mobile station of claim 17, further including means for selectively activating said receiving means during predetermined timeslots in a multiframe and deactivating said receiving means during other times to thereby reduce power consumption.

19. The mobile station of claim 18, wherein said mobile station has a binary identification number and said timeslots in a multiframe are determined by a predetermined number of bits in said identification number.

20. The mobile station of claim 17, wherein said speech information is transmitted and received over said analog traffic channels in an analog format.

21. The mobile station of claim 17, further comprising:

means for transmitting control information over said analog control channel.

22. The mobile station according to claim 21, further comprising:

means for transmitting control information over said [second]digital control channel.

23. A cellular radio telephone communications system for communicating over analog or digital traffic channels, comprising:

a mobile switching center;

plural base stations connected to said mobile switching center, for receiving and transmitting speech information and control information; and plural mobile radio telephone stations, including at least one multi-mode mobile station including:

means for receiving speech and data information from a first base station over the analog and digital traffic channels;

means for transmitting speech and data information to said first base station over the analog and digital traffic channels;

means for receiving and decoding control information in an analog format from said first base station over an analog control channel; and means for receiving and decoding control information in a digital format from said first base station over a digital control channel;

a mode selection switch for switching the mobile station between an analog mode and a digital mode, said switch being initially set to its digital mode for receiving digital control communications over said digital control channel from one of the base stations;

means for scanning a set of digital control channels, received from said digital control communications when said mobile station is switched to a digital mode;

first overhead message receiving means for determining if one of said digital control channels is available;

means for conducting control communications with one of said base stations over a digital control channel associated with this base station if said one of the digital control channels is available;

means for scanning a set of analog control channels if none of said digital control channels is available;

second overhead message receiving means for determining if one of said analog control channels is available; and means for conducting control communications with one of said base stations over an analog control channel associated with this base station if said one of the analog control channels is available.

24. The system according to claim 23, wherein each multi-mode mobile station further includes:

means for transmitting control information over said analog control channel.

25. The system according to claim 24, wherein at least some of said multi-mode mobile stations also include:

means for transmitting control information over said digital control channel.

26. The system according to claim 23, each multi-mode mobile station further comprising:

means for periodically scanning said digital control channel;

means for deactivating power to said mobile in the absence of paging information for said mobile station; and means for reactivating said scanning means after a preset time period.

* * * * *